Oct. 2, 1951 R. L. HARVEY ET AL 2,569,667

ELECTRICAL FILTER UNIT

Filed July 18, 1946

Inventor

Robert L. Harvey &

Vernon D. Landon

By C D Tuska

Attorney

Patented Oct. 2, 1951 2,569,667

UNITED STATES PATENT OFFICE 2,569,667

ELECTRICAL FILTER UNIT

Robert L. Harvey and Vernon D. Landon, Princeton, N. J., assignors to Radio Corporation of America, a corporation of Delaware Application July 18, 1946, Serial No. 684,622

10 Claims. (Cl. 178—44)

This invention relates to electrical filter units and particularly to high-frequency filter units suited for inclusion in power supply circuits, measuring circuits, modulating circuits and the like, used with high-frequency signal generators, transmitters, receivers and other high-frequency equipment.

From the need to supply the tubes used in high-frequency equipment with operating currents or voltages from a local power supply arises many problems: for example, in superheterodyne receivers, signal generators and the like, the supply leads to the oscillator tube serve undesirably to transmit, by conduction or radiation, part of the high-frequency oscillator output and conversely, extraneous signals picked up by the power supply or its leads may be fed thereby into the equipment, and particularly if they are of a frequency for which some stage therein, such as an intermediate frequency amplifier stage in a superheterodyne receiver, is tuned such signals create troublesome interference. Generally similar problems constantly arise in other instances where conductors necessary for transmission of current of one frequency may undesirably transmit currents of other frequencies.

Among the objects of this invention is the provision of a compact filter capable of effectively attenuating one or more frequencies whose transmission by conductors provided for other purposes is to be avoided.

In accordance with the invention, all impedance elements of a multisection filter are enclosed within a tubular sheath which serves as an electrical shield and which may also serve as the interposed continuation of the outer conductor of the input and output cables of the filter.

More specifically, the capacitors or shunt elements of the filter are spaced longitudinally of and within the tubular sheath and are of hollow cylindrical construction or equivalent feed-through type for passage therethrough of a conductor which includes or itself forms the high impedance series elements of the filter. The plate structures of each capacitor are connected respectively to the sheath and to the inner conductor between an adjacent pair of high impedance series sections: more specifically, the capacitor connections to the sheath are provided by capacitor-supporting members or discs which may also serve as spacers between aligned tubes of insulating material over which the sheath, when of wire braid or like non-rigid material, is disposed.

The invention further resides in features of construction, combination and arrangement hereinafter described and claimed.

For more detailed understanding of the invention, and for illustration of embodiments thereof, reference is made to the accompanying drawings, in which.

Figures 1, 2, 3, 4, 5, 6:
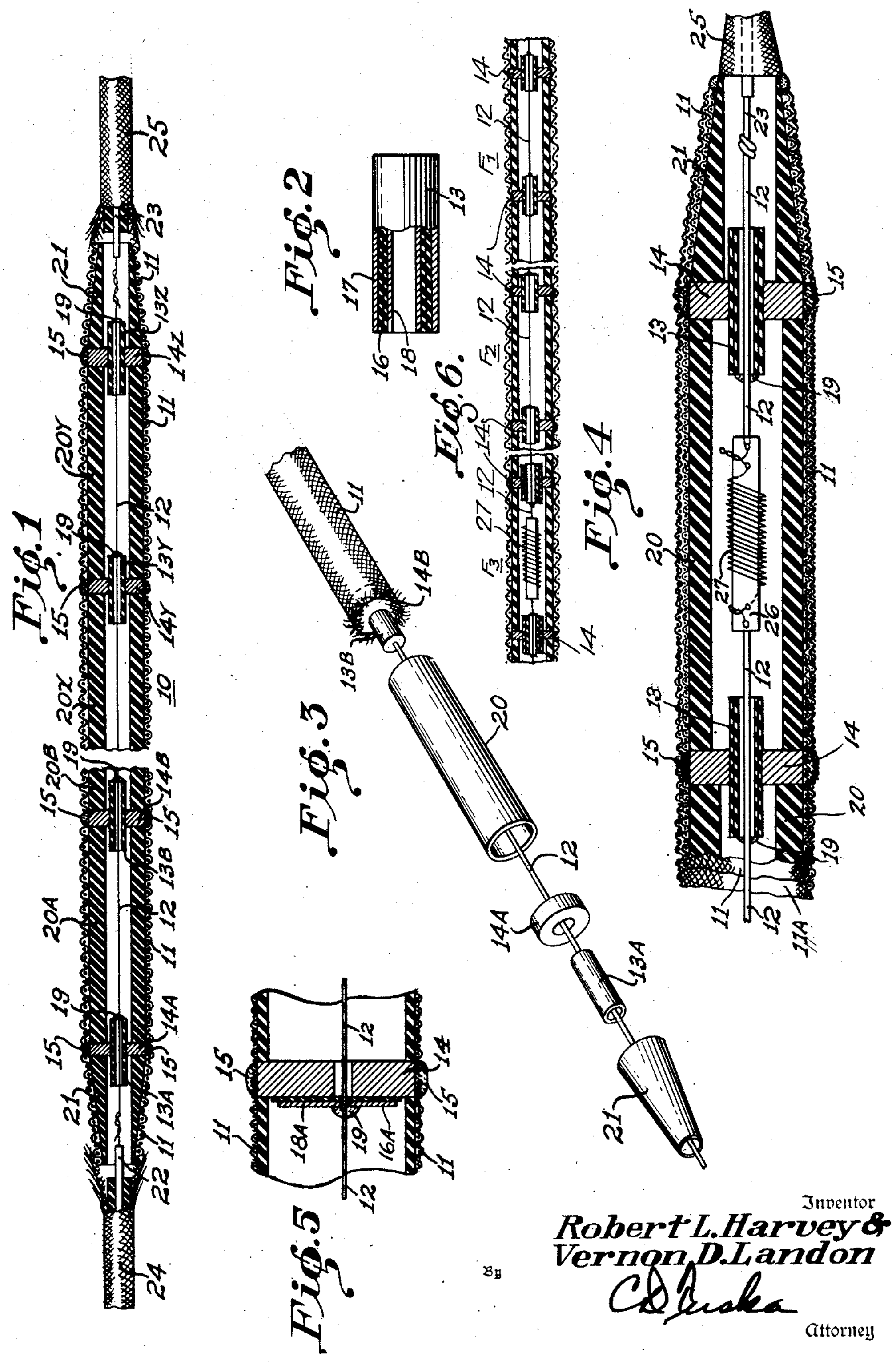
Figure 1 is a cross-sectional view illustrating the construction of a multi-section filter unit.
Figure 2 is a detailed view, on enlarged scale, of one of the capacitor elements of Figure 1.
Figure 3 is an exploded view illustrating components of the filter of Figure 1.
Figure 4 is a fractional sectional view, on enlarged scale, showing a filter construction utilizing a modified form of series impedance element.
Figure 5 is a detailed sectional view, on enlarged scale, including a modified form of capacitor element.
Figure 6 is a sectional view of a composite multi-section filter.

Referring to Figure 1, the filter unit 10 comprises a tubular outer conductor or sheath 11 through which axially extends an inner conductor 12 which passes through a row or series of capacitors 13A—13Z, individually supported within the outer conductor 11 by a corresponding number of conductive discs 14A—14Z. The outer periphery of each of discs 14A—14Z engages and is in electrical contact with the inner surface of the tubular sheath 11 and when, as in the preferred construction, the tubular sheath 11 is of wire braid construction, the discs 14A—14Z are secured thereto as by rings of solder 15, the solder flowing through the interstices of the braid and firmly attaching the discs to it. The discs also snugly receive the tubular capacitors and serve electrically to connect them to the sheath.

As more clearly appears in Figure 2, each of the capacitors, generically represented by capacitor 13 of Figure 2, may comprise a tube of suitable dielectric 16, for example ceramic material impregnated with titanium oxide, whose outer surface is covered with a metallic film forming the outer plate 17, and whose inner surface is coated with a metallic film serving as the other condenser plate 18. The opening in each of the spacing discs 14A—14Z may be such that the disc closely fits, is soldered to and makes electrical contact with the external plate structure 17, thus to connect one plate of each of the capacitors to the sheath 11. The other plate structure of each of the capacitors is electrically connected to the inner conductor 12 as by a drop of solder 19.

Preferably, and as already stated, the outer conductor or sheath 11 of the filter unit is wire braid which of itself is not sufficiently rigid to resist deformation and, therefore, the required support to prevent its collapse is provided by a series of aligned tubes 20A—20Y, af Bakelite or other suitable insulating material, each having an outer diameter selected to suit the sheath to be used and each of suitable thickness to afford the required strength.

The unit may be assembled by pulling the braid over a section of tubing and then alternately inserting the discs 14A—14Z and the other elements of tubing. The discs 14A—14Z serve as spacer elements between the adjacent pairs of tubular sections and when soldered to the sheathing 11, serve to hold the tubes in place. One or more additional sheaths of wire braid, generically represented by sheath 11A, Figure 4, may be pulled over the assembly, thus in effect to attain a continuous shielding surface notwithstanding the openings in the braid of the individual sheaths.

Preferably and as shown, the terminal tubular sections 21 are tapered progressively to change the diameter of the outer conductor 11 from the diameter of the discs 14 to a diameter approximating that of the outer conductors or sheaths 24 and 25 of the cables to and from the filter unit. By way of example, the diameter of discs 14 for use in a filter suited to prevent passage of frequencies of the order of 1500 megacycles may be approximately one-half inch, and the capacitance of the capacitors 13 is about 50 micromicrofarads. From this information and from the proportions indicated in Figure 1, the other dimensions are readily ascertainable.

When the filter is to be used to attenuate very high frequencies, the intervals at which the capacitors are spaced within the sheathing 11 is about one quarter wavelengths of the frequency to be attenuated. Attenuation at two or more frequencies is attainable by correspondingly selecting the spacing between the feed-through capacitors so that for each frequency to be attenuated there is at least one filter section which is about one quarter wavelength long at that frequency (see sections $F_1$, $F_2$; Fig. 6).

With wavelengths of the order of say below twenty-five centimeters the length of even a five-section filter is reasonable. When, however, a frequency to be attentuated is materially lower, the one quarter wavelength spacing would result in excessively great length of a multi-section filter. In such cases, to obtain the desired high series impedances, the conductor 12 may be coiled to form a lumped inductance between each adjacent pair of shunt capacitors. As shown in Figure 4, a coil 27 of the required number of turns, is wound upon a form 26 and the opposite terminals of the coil are connected to adjacent sections of the conductor 12 for inclusion therein.

By providing one or more sections using lumped inductance and one or more sections using the distributed inductance of a concentric line, Fig. 4, the compact self-shielded filter is suited to attenuate both very high frequencies, of the order of 1500 megacycles for example, and relatively low frequencies, of the order of 200 megacycles (see sections $F_3$ and $F_1$ or $F_2$; Fig. 6). A composite filter of such nature and construction has been used in very high frequency superheterodyne receivers to attenuate frequencies corresponding with the frequencies of the oscillator and the intermediate frequency stages, so to prevent the high-frequency energy of the oscillator from being fed into the power supply conductors and to prevent any extraneous signals at intermediate frequencies picked up by the power supply from being fed into the intermediate amplifier stages.

In each of these modifications the input conductor 22 and output conductor 23 of the filter are connected to the opposite ends of the inner conductor 12 which thus serves as an interposed continuation of them. The outer conductor or sheathing of the filter may be connected to any suitable point of ground or guard potential, and in addition or alternatively, the opposite ends of the tubular conductor 11 may be joined to and form a continuation of the outer tubular conductors 24 and 25 of the input and output cables which may be used for transmission of current or power supply to the oscillator of a signal generator, transmitter, or other high-frequency equipment such as disclosed, for example, in copending applications, Serial Nos. 681,456, now abandoned, and 683,055, or it may be used for connection of a measuring circuit to a measuring device traversed by high-frequency current which it is desired to exclude from the measuring circuit. An example of such measuring circuit is disclosed in aforesaid application, Serial No. 683,055.

In Figure 5 there is disclosed another type of feed-through capacitor which is suited for use in the compact multi-section filter units of the type disclosed in Figures 1 and 4. In this arrangement the spacing ring 14 itself forms one of the capacitor plate structures and the other plate 18A is a flat plate or disc spaced from the plate 14 by a thin sheet or layer of dielectric 16A, such for example as a sheet of mica. The conductor 12 passes through aligned openings in the discs and is attached as by solder 19 to the plate structure 18A. A similar arrangement may be used on the other side of disc 14 if greater capacity is required.

It is to be understood the filter unit is not limited to use for filters whose series-impedance elements are purely inductive and whose shunt elements are purely capacitative; for example, the discs 14A—14Z may be of resistance material so that in effect the shunt path at the junction of the series-impedance sections comprises a resistance and a capacitor in series, and/or the series-impedance coil 27 of Figure 4 may be of resistance wire. In short, the filter construction is flexible and lends itself for use in fabrication of several different types of filter networks in addition to the low-pass, shunt capacitor and series-inductance type specifically described and illustrated. Accordingly, the invention may be applied in many ways, all within the scope of the appended claims.

We claim as our invention:

1. An ultra-high frequency multi-section filter unit for physical and electrical interposition in shielded leads thereto comprising a flexible outer conductor for connection at its opposite ends to the respective outer conductors of said leads, a plurality of apertured conductive disks within and peripherally engaging said flexible outer conductor, a series of tubes of insulating material, each about one-quarter wavelength long for spacing adjacent pairs of said disks and for supporting said flexible outer conductor, a series of tubular capacitors each extending through and supported by one of said conductive disks with its outer plate connected thereby to said outer flexible conductor, and an inner conductor for connection at its opposite ends to the inner conductors of said shielded leads and extending through said tubular capacitors with connection to the inner plate of each of them.

2. A multi-section filter as in claim 1 in which the inner conductor between at least two of said disks is coiled to form a lumped inductance.

3. A multi-section filter as in claim 1 in which the inner conductor between at least two of said disks is a straight wire about one-quarter wavelength long at a frequency to be attenuated.

4. A multi-section filter as in claim 1 in which for attenuation of different frequencies the effective electrical lengths of the inner conductor between different pairs of said disks are respectively about one-quarter wavelength for said different frequencies.

5. A multi-section filter as in claim 4 in which the inner conductor between at least two of said disks is coiled to form a lumped inductance.

6. A high-frequency multi-section filter unit for physical and electrical interposition in shielded leads thereto comprising a flexible outer conductor for connection at its opposite ends to the respective outer conductors of said leads, a plurality of apertured conductive disks within and peripherally engaging said flexible outer conductor, a series of tubes of insulating material for spacing adjacent pairs of said disks and for supporting said flexible outer conductor, an inner conductor for connection at its opposite ends to the inner conductors of said shielded leads and extending through said apertured disks, and a series of capacitors through which said inner conductor also extends, each of said capacitors having an electrode connected to said inner conductor and an electrode connected to said outer conductor by an associated one of said disks.

7. A multi-section filter as in claim 6 in which the inner conductor between at least two of said disks is coiled to form a lumped inductance.

8. A multi-section filter as in claim 6 in which the inner conductor between at least two of said disks is a straight wire about one-quarter wavelength long at a frequency to be attenuated.

9. A multi-section filter as in claim 6 in which for attenuation of different frequencies the effective electrical lengths of the inner conductor between different pairs of said disks are respectively about one-quarter wavelength for said different frequencies.

10. A multi-section filter as in claim 9 in which the inner conductor between at least two of said disks is coiled to form a lumped inductance.

ROBERT L. HARVEY.
VERNON D. LANDON.

REFERENCES CITED

The following references are of record in the file of this patent:

UNITED STATES PATENTS

| Number | Name | Date |
|---|---|---|
| 2,030,179 | Potter | Feb. 11, 1936 |
| 2,109,843 | Kassner | Mar. 1, 1938 |
| 2,163,775 | Conklin | June 27, 1939 |
| 2,221,105 | Otto | Nov. 12, 1940 |
| 2 228,797 | Wassermann | Jan. 14, 1941 |
| 2,399,674 | Harrison | May 7, 1946 |
| 2,409,556 | George | Oct. 15, 1946 |
| 2,438,913 | Hanse | Apr. 6, 1948 |
| 2,456,803 | Wheeler | Dec. 21, 1948 |
| 2,479,687 | Linder | Aug. 23, 1949 |
| 2,491,681 | Minter | Dec. 20, 1949 |